United States Patent [19]

Katzmann et al.

[11] Patent Number: 4,690,029
[45] Date of Patent: Sep. 1, 1987

[54] METHOD OF SECURING A FLARE COMPOSITION SLEEVE IN A BLIND BOREHOLE AT THE TAIL PORTION OF A PROJECTILE BODY

[75] Inventors: Harald Katzmann, Neuenhof; Werner Senn, Zurich; David Ammann, Gossau, all of Switzerland

[73] Assignee: Werkzeugmaschinenfabrik Oerlikon-Bührle AG, Zurich, Switzerland

[21] Appl. No.: 939,860

[22] Filed: Dec. 9, 1986

[30] Foreign Application Priority Data

Dec. 16, 1985 [CH] Switzerland ............. 05353/85

[51] Int. Cl.⁴ ............................................. F42B 3/00
[52] U.S. Cl. ........................... 86/20.11; 102/336; 102/393; 102/513; 29/1.2
[58] Field of Search ............ 102/336, 343, 513; 86/20.11; 29/1.2

[56] References Cited

U.S. PATENT DOCUMENTS

| | | | |
|---|---|---|---|
| 3,349,712 | 10/1967 | Schwager et al. | 102/522 |
| 3,435,768 | 4/1969 | Engel | 102/523 X |
| 3,710,723 | 1/1973 | Muller et al. | 102/513 |
| 3,765,336 | 10/1973 | Klusik | 102/505 |
| 3,972,291 | 8/1976 | Braun, Jr. et al. | 102/513 |
| 4,249,466 | 2/1981 | Rossmann et al. | 102/513 |
| 4,528,911 | 7/1985 | DePhillipo et al. | 102/513 |

FOREIGN PATENT DOCUMENTS 2398283 2/1979 France .
2544407 10/1984 France .

Primary Examiner—Peter A. Nelson
Attorney, Agent, or Firm—Werner W. Kleeman

[57] ABSTRACT

Up to now exceedingly precise manufacturing tolerances had to be observed in securing or mounting a flare composition or incandescent charge sleeve in a blind borehole in the tail portion of a projectile body to ensure reliable sealing against propellant gases. To prevent this disadvantage a bolt member or plug is inserted into the blind borehole of the projectile body until the face or end surface of this bolt member or plug abuts the bottom region or portion of the blind borehole. The bolt member or plug and the projectile body are rotated relative to one another. Due to friction between the end surface of the bolt member or plug and the bottom portion of the blind borehole sufficient heat is generated at the front end of the bolt member or plug such that material of this front end of the bolt member or plug flows into an annular groove of the blind borehole to form a flange member. This flange member securely anchors the bolt member or plug in the blind borehole. Then by appropriately machining the thus anchored bolt member or plug there can be formed the flare composition sleeve.

4 Claims, 2 Drawing Figures

METHOD OF SECURING A FLARE COMPOSITION SLEEVE IN A BLIND BOREHOLE AT THE TAIL PORTION OF A PROJECTILE BODY

BACKGROUND OF THE INVENTION

The present invention broadly relates to a new and improved method of securing or mounting a flare composition or incandescent charge sleeve in a borehole or bore and, more specifically, pertains to a new and improved method of securing or mounting a flare composition or incandescent charge sleeve in a blind borehole at the tail portion of a projectile body.

Generally speaking, the method of the present invention comprises the steps of forming a blind borehole in the tail portion of the projectile body and containing an annular groove in the side wall or wall of this blind borehole. An edge or end portion of the flare composition or incandescent charge sleeve is pressed into this blind borehole.

A state-of-the-art method according to the European Patent No. 0,072,050 proposes initially pressing a flare composition or incandescent charge sleeve into the bore with the help of a press pin or the like and subsequently pressing a preferably elastically deformable plastic peg or plug by means of a peening device against the bottom portion of the bore such that this peg or plug radially expands, thereby pressing the edge of the sleeve into the groove.

Several other methods of securing a flare composition or incandescent charge sleeve in a bore or borehole at the tail portion of a projectile body are known for example from German Patent No. 2,826,497 and the cognate U.S. Pat. No. 4,249,466, granted Feb. 10, 1981. In particular, the sleeve can possess a larger outer diameter than the diameter of the bore so that a press or force fit insertion can be effected. Securing of the sleeve can also be accomplished by providing an adhesive bond or by flanging or beading.

All these known methods have certain disadvantages. Either they are too expensive, not reliable enough or not suitable for the manufacture of large quantities, i.e. mass production.

SUMMARY OF THE INVENTION

Therefore, with the foregoing in mind, it is a primary object of the present invention to provide a new and improved method of securing a flare composition or incandescent charge sleeve in a blind borehole at the tail portion of a projectile body which does not exhibit the aforementioned drawbacks and shortcomings of the prior art methods.

Another and more specific object of the present invention aims at providing a new and improved method of securing a flare composition sleeve in a blind borehole in the tail portion of a projectile body by means of which there can be accomplished, on the one hand, a reliable and secure mutual affixing or securement of both parts, i.e. the sleeve and the projectile body to one another and, on the other hand, mass production of such positively interconnected sleeve and projectile body is readily and economically possible.

Yet a further significant object of the present invention aims at providing a new and improved method of reliably and economically fabricating sabot projectiles containing a projectile body at whose tail portion there is securely and positively affixed a flare composition sleeve.

Now in order to implement these and still further objects of the present invention which will become more readily apparent as the description proceeds, the securing method of the present invention is manifested by the features that a bolt member or plug out of which the sleeve for the flare composition or incandescent charge is manufactured is inserted into the blind borehole of the projectile body until the face or end surface of the bolt member or plug abuts or touches the bottom portion of the blind borehole. A force or pressure is exerted upon this bolt member or plug to retain contact of the end surface of the bolt member or plug with the bottom of the borehole. The bolt member or plug and projectile body are rotated relative to one another such as by rotating the bolt member or plug about its lengthwise axis in relation to the borehole. Friction between the face or end surface of the bolt member or plug and the bottom portion of the borehole generates heat. This heat causes a temperature rise of the end surface or portion of the bolt member or plug which is in contact with the bottom portion of the borehole until material of this bolt or plug end portion flows into an annular groove in the side wall or wall of the blind borehole. In this manner an integral flange member is produced. This flange member affixes or attaches the bolt member or plug securely in the blind borehole. Subsequently the thus positively secured bolt member or plug is machined, typically by being drilled in order to form the flare composition or incandescent charge sleeve.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Describing now the drawings, it is to be understood that to simplify the showing thereof, only enough of the structure of the sabot projectile containing a flare composition sleeve secured to the tail portion of the projectile body thereof in accordance with the inventive method has been illustrated therein as is needed to enable one skilled in the art to readily understand the underlying principles and concepts of the present invention.

Figure 1:
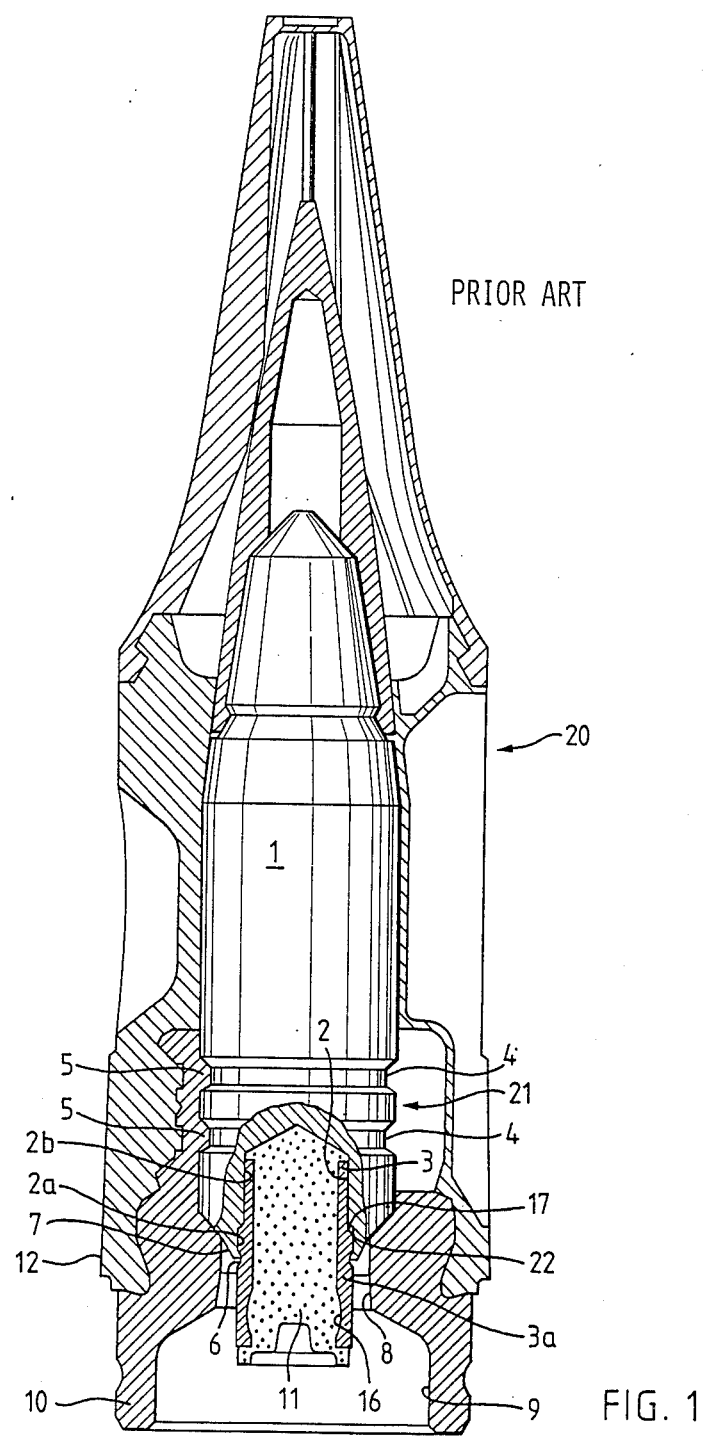
FIG. 1 shows a longitudinal cross-section of a prior art sabot projectile.

Turning now specifically to FIG. 1 of the drawings, the prior art sabot projectile 20 illustrated therein will be seen to comprise a projectile body 1 forming part of such sabot projectile 20. In the rear or tail portion 21 of this sabot projectile 20 there is present a recess in the form of a blind borehole or bore 2, the lengthwise axis of which is essentially coaxial with that of the projectile body 1. This blind borehole 2 comprises two sections or portions 2a and 2b, and the diameter of the first section or portion 2a is larger than that of the second section or portion 2b. In this blind borehole 2 there is located the front end or upper portion of a flare composition or incandescent charge sleeve 3. This front end or upper portion of the flare composition or incandescent charge sleeve 3 is press-fitted into the second section 2b of the blind borehole 2 such that a shoulder 17 of the flare composition sleeve 3 bears against a shoulder or collar 22 of the projectile body 1.

The rear end or lower portion 3a of the flare composition sleeve 3 possesses an outer annular groove 6 into which a thin-walled collar or flange member 7 of the projectile body 1 is connectively flanged or beaded. The flare composition or incandescent sleeve 3 possesses a continuous or open-ended bore of essentially constant diameter and extends downwardly or rearwardly from the tail portion 21 of the projectile body 1 and projects into a central bore 8 of the sabot tail portion 10. This central bore 8 of the sabot tail portion 10 merges with or opens into a larger recess or central opening 9 of the sabot tail portion 10. The provided press fit which retains the flare composition or incandescent charge sleeve 3 in its position prevents propellant gases from entering the blind borehole 2 upon firing of the sabot projectile 20.

The flare composition sleeve 3 contains a flare composition or incandescent charge 11 which is ignited by the propellant gases at the back or rear end thereof. If propellant gases should penetrate between the wall surface of the blind borehole 2 and the flare composition sleeve 3 there then would exist the danger that the flare composition sleeve 3 or the incandescent charge 11 might be prematurely expelled or that the incandescent charge 11 might be ignited at the front part or region thereof, i.e. at the bottom region or portion of the blind borehole 2.

Connected to the sabot tail portion 10 is a projectile jacket 12 which is preferably formed of plastic or the like. A ring-shaped groove 16 on the inner wall of the flare composition sleeve 3 ensures a good anchoring of the flare composition or incandescent charge 11 within the flare composition sleeve 3. The projectile body 1 has two circumferential grooves 4 into which projects, for instance, six protuberances or dogs 5 which are part of the sabot tail portion 10 and which are equally divided or equidistantly spaced around the circumferential grooves 4. In FIG. 1 only one protuberance or dog 5 in each circumferential groove 4 is shown. Details of the manner of securing the projectile jacket 12 to the sabot tail portion 10 of the sabot projectile 20 do not constitute subject matter of the present invention and are well known in this art, for instance as exemplified by the commonly assigned U.S. Pat. No. 3,927,618, granted Dec. 23, 1975, to which reference may be readily had.

Figure 2:
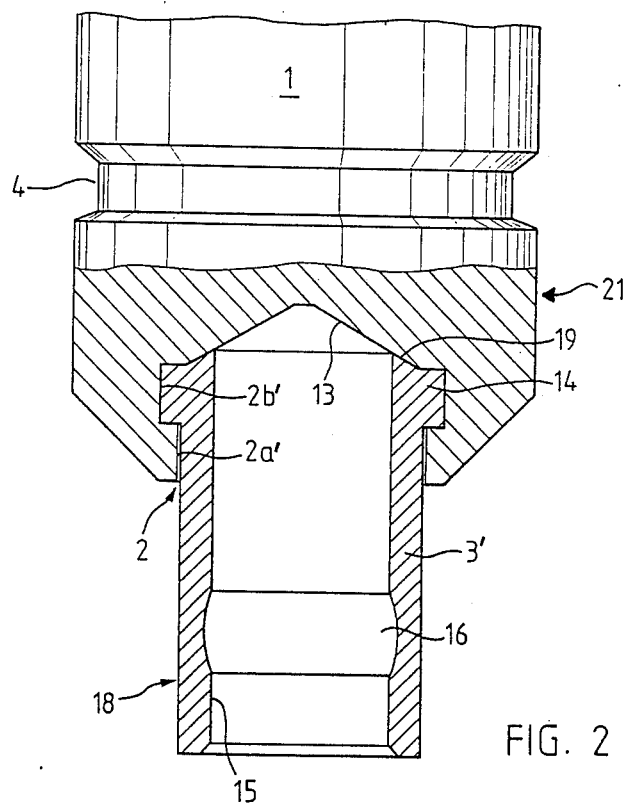
FIG. 2 shows to a larger scale a longitudinal cross sectional view of the tail portion of a sabot projectile body incorporating the flare composition or incandescent charge sleeve secured thereto in accordance with the present invention.

Turning now to FIG. 2 which concerns the teachings of the present invention, there is illustrated therein by way of example and not limitation a projectile body 1 fabricated with the thereto secured flare composition or incandescent charge sleeve 3' according to the inventive method. In a rear or tail portion 21 of the projectile body 1 there is provided a blind borehole or bore 2 having two longitudinal sections or portions 2a' and 2b'. The front or upper section or portion 2b', which defines an annular groove, has a larger diameter than the rear or lower section or portion 2a'. The bottom portion or base 13 of this blind borehole 2 is substantially cone-shaped or conical and points in the forward or upper direction. The cone angle is, for instance, approximately 120°. In this blind borehole 2 there is secured or mounted a flare composition or incandescent charge sleeve 3' such that a flange member 14 in the front or upper end portion of the flare composition sleeve 3' projects into the front or upper section 2b' in the side wall or wall of the blind borehole 2. In order to anchor the flare composition or incandescent charge 11 properly in the flare composition sleeve 3' there is also provided a substantially ring-shaped or annular groove 16 in the inner wall 15 of the flare composition sleeve 3'.

The inventive method for positively securing or connecting the flare composition or incandescent charge sleeve 3' in the blind borehole 2 provided in the projectile body 1 will now be explained in greater detail by way of an exemplary embodiment.

Firstly, the blind borehole 2 is formed with the upper section 2b' providing the annular groove having a larger diameter than the lower cylindrical section or portion 2a'. Then a preferably solidly cylindrical member, typically a bolt member or plug 18, from which there is ultimately formed the flare composition sleeve 3', is inserted into the blind borehole 2 of the projectile body 1 until a face or end surface or portion 19 of the bolt member or plug 18 bears against or is in abutting relationship with the bottom portion or base 13 of the blind borehole 2. Pressure is exerted against the bolt member or plug 18 in the direction of the bottom portion or base 13 of the blind borehole 2 during such time as the bolt member or plug 18 is appropriately rotated or turned around its lengthwise axis. Rotation of the bolt member or plug 18 can be accomplished by any suitable machine tool appropriate for this purpose, such as a conventional friction spinning device or rotary tool structure. Because of the resistance prevailing between the face or end surface or portion 19 of the bolt member or plug 18 and the bottom portion or base 13 of the blind borehole 2 the temperature of the end portion of the bolt member or plug 18 adjacent the bottom portion or base 13 will increase due to the generated frictional heat or thermal energy. This generation of heat will ultimately cause such a temperature rise that the flow limit of the material at the region of this end portion 19 of the bolt member or plug 18 will be exceeded, i.e. the material of the bolt member or plug 18 deforms. The upwardly or axially directed force or pressure applied against the bolt member or plug 18 will cause this material, which has softened, to flow and enter into the annular groove or upper section 2b' thereby forming the connecting flange member 14. Thereafter the bolt member or plug is machined or bored out as by performing a suitable drilling operation in order to form the flare composition or incandescent charge sleeve 3' and there is then machined or turned as, for instance by using a lathe, the ring-shaped groove 16 at the inner wall 15 of the flare composition or incandescent charge sleeve 3'.

Finally, it is mentioned that the projectile body and the bolt member or plug from which there is formed the flare composition sleeve can be fabricated from conventional materials as is well known in the art. For instance, the material from which there is formed the projectile body may be a heavy metal or hard metal alloy or a tungsten alloy and the material from which there is formed the flare composition sleeve may be formed, for instance, from a steel alloy. Also, by way of completeness it is mentioned that the relative rotation accomplished between the bolt member or plug and the blind borehole of the projectile body also can be achieved by appropriately rotating the projectile body in relation to the bolt member or plug.

While there are shown and described present preferred embodiments of the invention, it is to be distinctly understood that the invention is not limited thereto, but may be otherwise variously embodied and practiced within the scope of the following claims. Accordingly,

What we claim is:

1. A method of securing a flare composition sleeve in a blind borehole at the tail portion of a projectile body, comprising the steps of:
    forming at the tail portion of the projectile body a blind borehole having an annular groove located at a predetermined region of the blind borehole;
    providing a bolt member from which there is to be formed said flare composition sleeve;
    inserting said bolt member into said blind borehole until an end surface thereof abuts against a bottom portion of said blind borehole;
    rotating said bolt member and said projectile body containing the blind borehole relative to one another while exerting pressure between the relatively rotating bolt member and the projectile body conforming the blind borehole to produce frictional heat;
    generating during said relative rotation of the bolt member and the blind borehole due to frictional heat a rise in temperature at the region of said end surface of said bolt member;
    continuing said relative rotation until said temperature rise is sufficient to cause a flow of material at the region of said end surface of said bolt member into said annular groove in order to form a flange member at said bolt member which is thus secured in said annular groove and the blind borehole by means of the flange member; and
    then machining the bolt member secured in the blind borehole in order to form the flare composition sleeve.

2. A method of securing a flare composition sleeve in a blind borehole at the tail portion of a projectile body, comprising the steps of:
    forming at the tail portion of the projectile body a blind borehole having an annular groove located at the region of a bottom portion of the blind borehole;
    providing a bolt member from which there is to be formed said flare composition sleeve;
    inserting said bolt member into said blind borehole until an end portion thereof abuts against said bottom portion of said blind borehole;
    exerting pressure onto said bolt member in the direction of said bottom portion of said blind borehole of the projectile body while rotating said bolt member relative to said blind borehole;
    generating during said rotation of the bolt member relative to the blind borehole a rise in temperature in said end portion of said bolt member due to friction arising between said end portion of said bolt member and said bottom portion of the blind borehole;
    continuing said rotation until said temperature rise is sufficient to cause a flow of material of said end portion of said bolt member into said annular groove in order to form a flange member at said bolt member which is thus secured in said annular groove of the blind borehole of the projectile body; and
    then machining the bolt member secured by said flange member in the blind borehole of the projectile body in order to form the flare composition sleeve.

3. The method as defined in claim 1, wherein:
    said machining step entails drilling a hole into the bolt member to form the flare composition sleeve.

4. The method as defined in claim 1, further including the steps of:
    using a substantially solid cylindrical body as the bolt member from which there is ultimately formed the flare composition sleeve.

* * * * *